(12) United States Patent
Ishigaki et al.

(10) Patent No.: US 9,853,551 B2
(45) Date of Patent: Dec. 26, 2017

(54) ISOLATED DC-DC POWER CONVERSION CIRCUIT

(71) Applicant: TOYOTA JIDOSHA KABUSHIKI KAISHA, Toyota-shi (JP)

(72) Inventors: Masanori Ishigaki, Ann Arbor, MI (US); Jongwon Shin, Ann Arbor, MI (US)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/143,917

(22) Filed: May 2, 2016

(65) Prior Publication Data

US 2017/0317596 A1    Nov. 2, 2017

(51) Int. Cl.
*H02M 3/335*    (2006.01)
*H02M 1/08*    (2006.01)
*H02M 1/00*    (2006.01)

(52) U.S. Cl.
CPC ......... *H02M 3/33507* (2013.01); *H02M 1/08* (2013.01); *H02M 2001/0009* (2013.01); *H02M 2001/0048* (2013.01)

(58) Field of Classification Search
CPC .. H02M 3/33584; H02M 3/285; H02M 3/005; H02M 2001/0058; H02M 7/493; Y02B 70/1491
USPC ......... 363/16–20, 21.04, 21.14, 89, 97, 127, 363/131; 318/139, 400.26, 400.3, 798, 318/812, 813
See application file for complete search history.

(56) References Cited

U.S. PATENT DOCUMENTS

| | | | | |
|---|---|---|---|---|
| 5,594,629 A | * | 1/1997 | Steigerwald | H02M 3/155 363/131 |
| 5,745,351 A | * | 4/1998 | Taurand | H02M 3/33584 363/131 |
| 6,069,804 A | * | 5/2000 | Ingman | H02J 7/0068 363/124 |
| 6,084,784 A | * | 7/2000 | Durbaum | H02M 3/33584 363/131 |
| 6,671,189 B2 | * | 12/2003 | Jansen | H02M 3/33576 363/21.13 |
| 8,064,228 B2 | | 11/2011 | Lee et al. | |
| 8,154,236 B2 | * | 4/2012 | Kimura | H02M 7/4807 318/400.26 |
| 9,130,462 B2 | | 9/2015 | Hu et al. | |
| 2008/0304292 A1 | * | 12/2008 | Zeng | H02M 3/285 363/21.12 |
| 2011/0069513 A1 | | 3/2011 | Lee et al. | |

(Continued)

*Primary Examiner* — Rajnikant Patel
(74) *Attorney, Agent, or Firm* — Oblon, McClelland, Maier & Neustadt, L.L.P.

(57) ABSTRACT

A power transfer system includes DC-DC power conversion circuitry that has a first switch and a second switch on either side of a first transformer and a first capacitor and a second capacitor on either side of a second transformer that is connected in parallel with the first transformer. Primary secondary sides of the DC-DC power conversion circuitry are aligned based a direction of power transfer. A quantity of power transfer through the DC-DC power conversion circuitry is determined based on power and voltage characteristics of electrical components. A duty cycle and a switching frequency for the first switch or second switch is determined based on the quantity of power to be transferred. The primary and secondary switches are controlled using switching.

19 Claims, 11 Drawing Sheets

(56) References Cited

U.S. PATENT DOCUMENTS

| | | |
|---|---|---|
| 2012/0140529 A1 | 6/2012 | Jin et al. |
| 2012/0163035 A1 | 6/2012 | Song et al. |
| 2013/0003424 A1 | 1/2013 | Song et al. |
| 2013/0121038 A1 | 5/2013 | Ryu et al. |
| 2014/0211521 A1 | 7/2014 | Mazumder |
| 2015/0043251 A1 | 2/2015 | Hasegawa |
| 2015/0326105 A1 | 11/2015 | Pan et al. |

\* cited by examiner

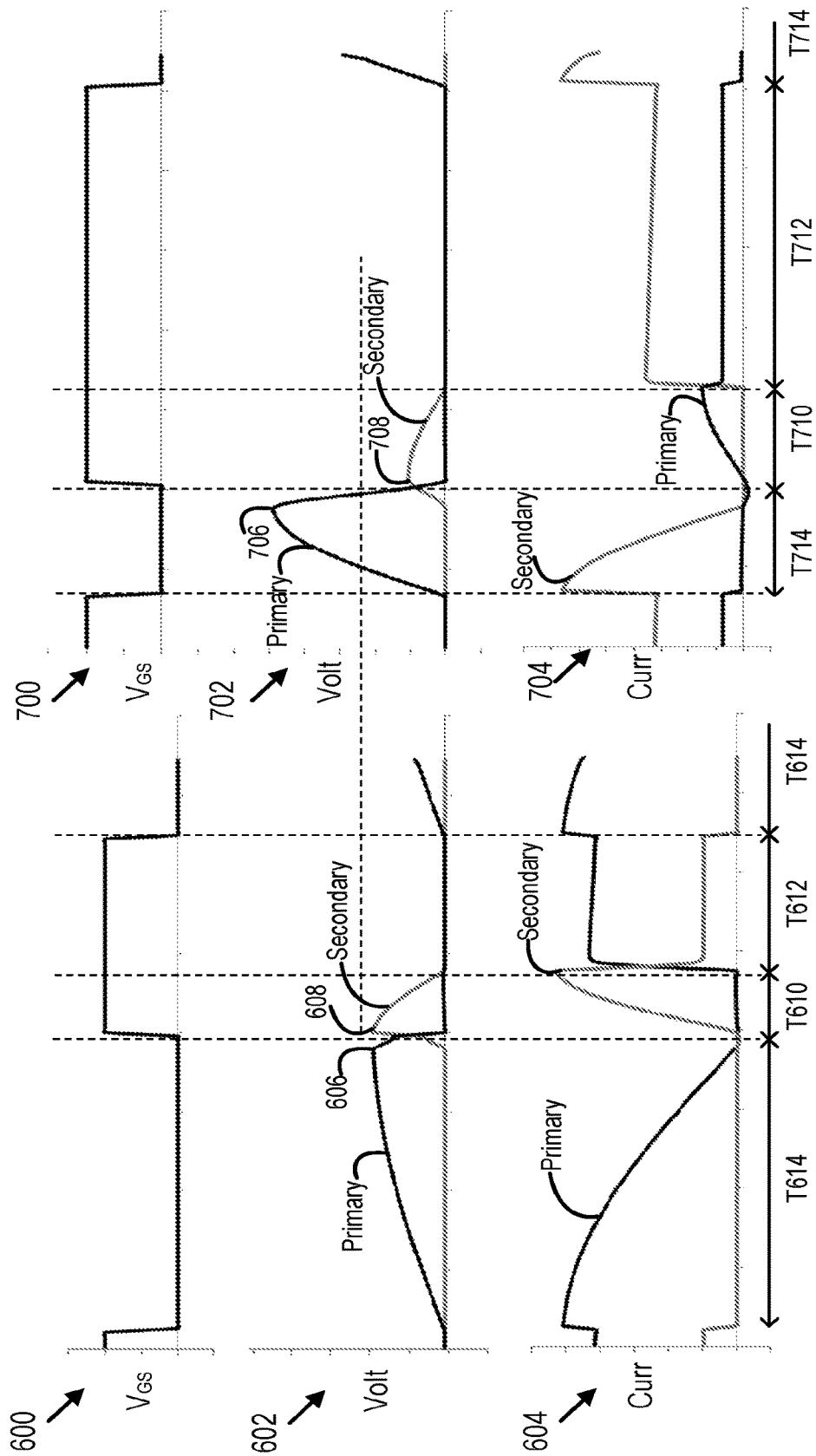

ISOLATED DC-DC POWER CONVERSION CIRCUIT

CROSS-REFERENCE TO RELATED PATENT APPLICATIONS

The present application incorporates by reference the entire contents of U.S. patent application Ser. No. 14/504,125 having common inventorship with the present application and filed in the U.S. Patent and Trademark Office on Oct. 1, 2014.

BACKGROUND

Power conversion circuits can include transformers or other components that isolate a primary side from a secondary side when the power sources or electrical loads on either side of the power conversion circuit have different ground potentials. U.S. Patent Application Publication 2015/0326105 to Pan et al describes a pulsating current ripple cancelling circuit for cancelling high-frequency current ripples with a ripple cancelling transformer coupled to a high frequency transformer and each respectively coupled to direct coupling blocking capacitors.

SUMMARY

In a first exemplary implementation, a power transfer system can include DC-DC power conversion circuitry that has a first switch and a second switch on either side of a first transformer and a first capacitor and a second capacitor on either side of a second transformer that is connected in parallel with the first transformer. Primary secondary sides of the DC-DC power conversion circuitry can be aligned based a direction of power transfer. A quantity of power transfer through the DC-DC power conversion circuitry can be determined based on power and voltage characteristics of electrical components. A duty cycle and a switching frequency for the first switch or second switch can be determined based on the quantity of power to be transferred. The primary and secondary switches can be controlled using switching.

The DC-DC power conversion circuitry can be configured to perform bi-directional power transfer.

An amount of isolation between the primary side and the secondary side of the DC-DC power conversion circuitry can be based on a first isolation voltage associated with the first capacitor and the second capacitor and a second isolation voltage associated with the second transformer. The amount of isolation between the primary side and the secondary side of the DC-DC power conversion circuitry can correspond to a total isolation voltage of greater than one kilovolt.

The system can control the switching of the first switch and the second switch with soft switching.

The quantity of power transfer through the DC-DC power conversion circuitry can include an amount of capacitive power transfer across the first capacitor, the second capacitor, and the second transformer and an amount of inductive power transfer across the first transformer. The amount of inductive power transfer can correspond to an inductive power transfer period during the duty cycle of the first switch and the amount of capacitive power transfer corresponds to a first capacitive power transfer period before the inductive power transfer period and a second capacitive power transfer period after the inductive power transfer period. A first time length of the first capacitive power transfer period can be equal to a second time length of the second capacitive power transfer period.

A first peak voltage of the first switch can be greater than a second peak voltage across the second switch during the duty cycle of the first switch or the second switch. A first voltage rating of the first switch can be greater than a second voltage rating of the second switch.

A voltage and current of the second transformer can be zero during an inductive power transfer period during the duty cycle of the first switch or the second switch. A size of the second transformer can be based on a time length of the inductive power transfer period. The size of the second transformer can be inversely proportional to the time length of the inductive power transfer period.

The primary side and the secondary side of the DC-DC power conversion circuitry can be symmetric across the first transformer and the second transformer.

The primary side and secondary side of the DC-DC power conversion circuitry can be connected to one or more power sources or electrical loads. The one or more power sources or electrical loads on the primary side and the secondary side of the DC-DC power conversion circuitry can have unequal ground potentials.

In another exemplary implementation, a process can include: aligning a primary side and a secondary side of DC-DC power conversion circuitry including a first switch and a second switch on either side of a first transformer and a first capacitor and a second capacitor on either side of a second transformer that is connected in parallel with the first transformer based on a direction of power transfer; determining a quantity of power transfer through the DC-DC power conversion circuitry based on power and voltage characteristics of electrical components; determining a duty cycle and a switching frequency for the first switch or the second switch based on the quantity of power transferred through the DC-DC power conversion circuitry; and controlling switching of the first switch and the second switch. A non-transitory computer-readable storage medium including executable instructions, which when executed by circuitry, can cause the circuitry to perform the process.

A further exemplary implementation can include a system controller with control circuitry that can determine a direction of power transfer through DC-DC power conversion circuitry including a first switch and a second switch on either side of a transformer with a first capacitor and a second capacitor cross-connected across the transformer; align a primary side and a secondary side of the DC-DC power conversion circuitry based on the determined direction of power transfer; determine a quantity of power transfer through the DC-DC power conversion circuitry based on power and voltage characteristics of electrical components; determine a duty cycle and a switching frequency for the first switch or the second switch based on the quantity of power transferred through the DC-DC power conversion circuitry; and control switching of the first switch and the second switch.

The foregoing general description of exemplary implementations and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 6 is an exemplary illustration of voltage and current graphs associated with an isolated DC-DC power conversion circuit;

FIG. 7 is an exemplary illustration of voltage and current graphs associated with an isolated DC-DC power conversion circuit;

DETAILED DESCRIPTION

Figures 1A, 1B:
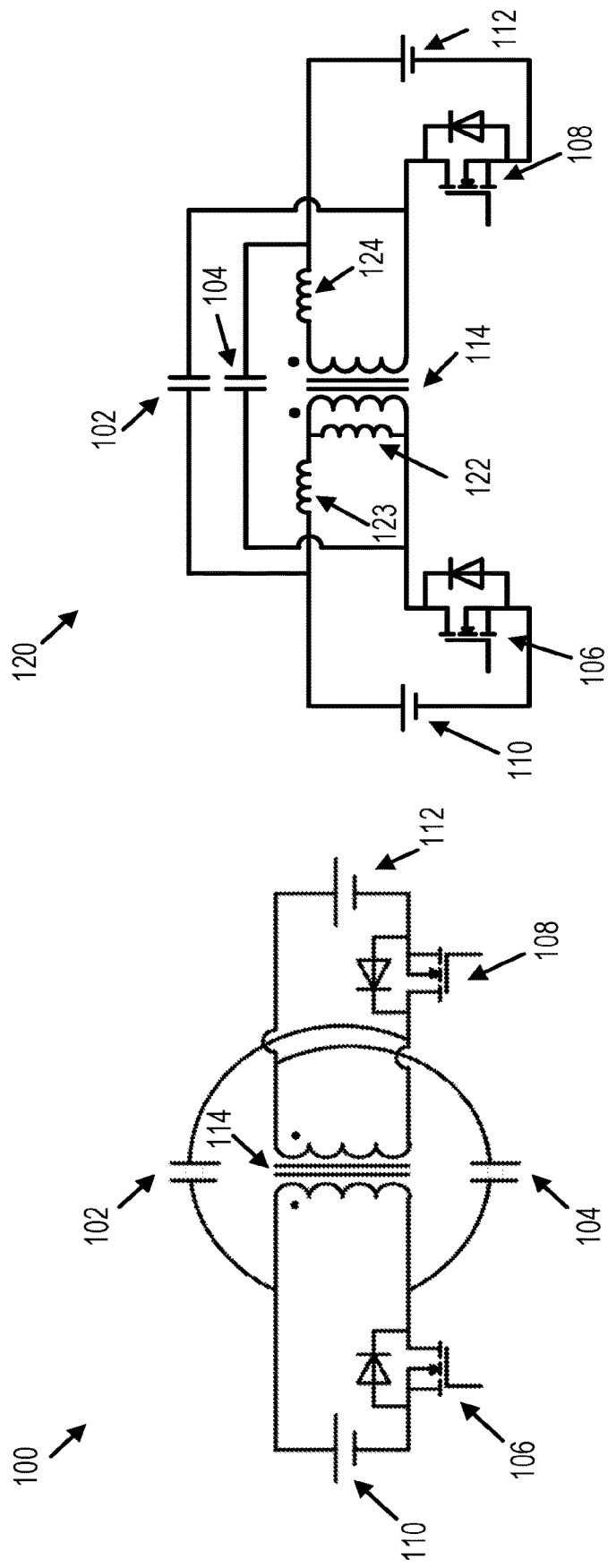
FIG. 1A is an exemplary schematic diagram of an isolated DC-DC power conversion circuit.
FIG. 1B is an exemplary schematic diagram of an isolated DC-DC power conversion circuit.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "about," and similar terms generally refer to ranges that include the identified value within a margin of 20%, 10%, or preferably 5%, and any values therebetween.

FIG. 1A is an exemplary illustration of an isolated DC-DC power conversion circuit 100. The DC-DC power conversion circuit 100 can include a primary side and a secondary side that are symmetrical on either side of a magnetic core transformer 114. In an exemplary implementation, capacitors 102 and 104 can be cross-connected across the magnetic core transformer 114. The primary side can include a primary switch 106 and a primary DC power source 110, and the secondary side can include a secondary switch 108 and a secondary DC power source 112. The primary DC power source 110 and the secondary DC power source 112 can function as either a power source or a power sink depending on the direction of power transfer through the DC-DC power conversion circuit 100. In an implementation, the capacitance values of the cross-connected capacitors 102 and 104 can be equal. The primary switch 106 and the secondary switch 108 can include a MOSFET with a diode connected from the source to the drain of the MOSFET. In some aspects, the turn ratio N of the magnetic core transformer 114 is determined based on the ratio of the voltage of the primary DC power source 110 to the voltage of the secondary DC power source 112.

In some implementations, the primary DC power source 110 and the secondary DC power source 112 may have unequal ground potentials, and the magnetic core transformer 114 and the cross-connected capacitors 102 and 104 provide isolation between the primary side and secondary side of the isolated DC-DC power conversion circuit 100. However, for high frequency applications where a switching frequency is greater than a predetermined threshold associated with an isolation impedance of the capacitors 102 and 104, the capacitors 102 and 104 may not be able to fully isolate the primary side from the secondary side of the DC-DC power conversion circuit 100. For example, the DC-DC power conversion circuit 100 may have a rated isolation voltage of 1 kilovolt (kV), which can mean that the capacitors 102 and 104 and/or the magnetic core transformer 114 breaks down at voltages greater than 1 kV.

In certain implementations, the DC-DC power conversion circuit 100 can be installed in an electrical system of a vehicle in order to transfer power from power sources to electrical loads. In some implementations, electrical components within a vehicle can act as either power sources or electrical loads depending on the application being carried out. For example, battery cells in an electric vehicle can act as an electrical load during charging operations when the vehicle is connected via a plug to an AC outlet. On the other hand, the battery cells can also act as power sources during discharge.

In order to allow the electrical components to operate as either power sources or electrical loads, the isolated DC-DC power conversion circuit 100 can operate bi-directionally due to the symmetry between the primary and secondary sides. More specifically, power can be transferred from the primary side to the secondary side or from the secondary side to the primary side. The direction of power transfer is based on whether the primary switch 106 or the secondary switch 108 is turned on and off. For example, if power is being transferred from the primary side to the secondary side, the primary switch 106 is cycled on and off. If power is being transferred from the secondary side to the primary side, the secondary switch 108 is cycled on and off. In addition, the switch on the side of the DC-DC power conversion circuit 100 that is receiving power can function as a synchronous rectifier to reduce circuit losses. For example, when power is transferred from the primary side to the secondary side of the DC-DC power conversion circuit 100 by cycling the primary switch 106 on and off, the secondary switch 108 can be the synchronous rectifier that is turned on and off at predetermined time intervals to provide a current path through the secondary switch 108 rather than through the parallel-connected diode. Also, the primary switch 106 and the secondary switch 108 can be operated with soft-switching, which can include zero current switching (ZCS) and/or zero voltage switching (ZVS). In some implementations, the primary switch 106 and secondary switch 108 are controlled by gate drivers that are integrated into the primary switch 106 and the secondary switch 108.

In some implementations, the DC-DC power conversion circuit 100 can also include sensors obtain sensor data from the components of the circuit, such as current sensors, voltage sensors, temperature sensors, and the like. For example, voltage sensors can measure voltage across the primary switch 106 or secondary switch 108 and can transmit the sensor data to a controller via a wired or wireless connection. The controller can control operations and detect failures of the DC-DC power conversion circuit 100 based on the received sensor data.

FIG. 1B is another exemplary illustration of an isolated DC-DC power conversion circuit 120. In addition to the components described with respect to the isolated DC-DC power conversion circuit 100 of FIG. 1A, the isolated DC-DC power conversion circuit 120 can also include an excitation inductor 122 and leakage inductors 123 and 124. In some aspects, the leakage inductor 123 is on the primary side and the leakage inductor 124 is on the secondary side of the isolated DC-DC power conversion circuit 120. In some implementations, the magnetic core transformer 114 can be an ideal transformer, and the excitation inductor 122 and/or the leakage inductors 123 and 124 can illustrate an equivalent circuit for a real transformer. The excitation inductor 122 can be added in parallel with the primary side of the magnetic core transformer 114 in order to account for non-zero reluctance within the magnetic core transformer. In addition, the leakage inductors 123 and 124 can demonstrate how imperfect coupling within the magnetic core transformer 114 can affect the functionality of the isolate DC-DC power conversion circuit 120. In order to provide a more concise description, the isolated DC-DC power conversion circuit 100 and 120 can be used interchangeably throughout the disclosure.

Figure 2A:
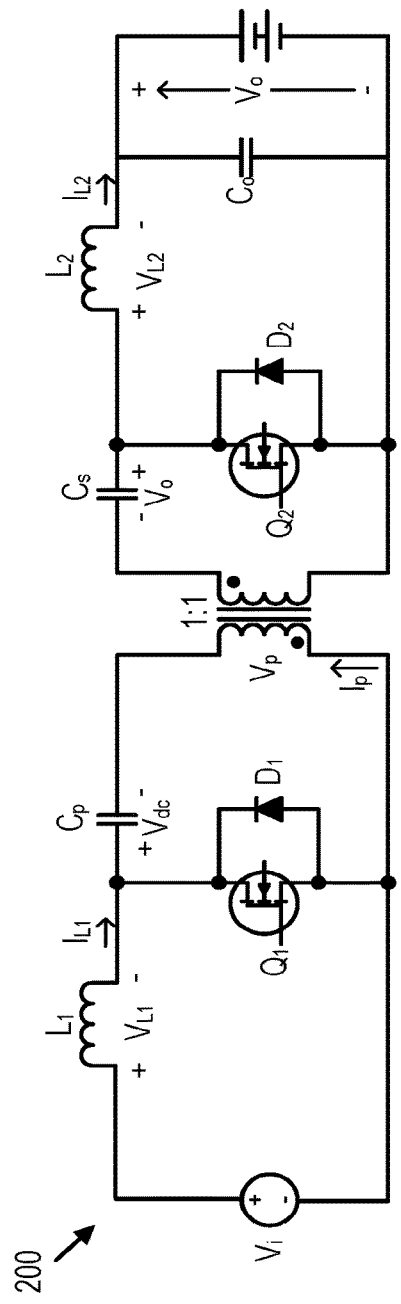
FIG. 2A is an exemplary schematic diagram of a Cuk power conversion circuit.
Figure 2B:
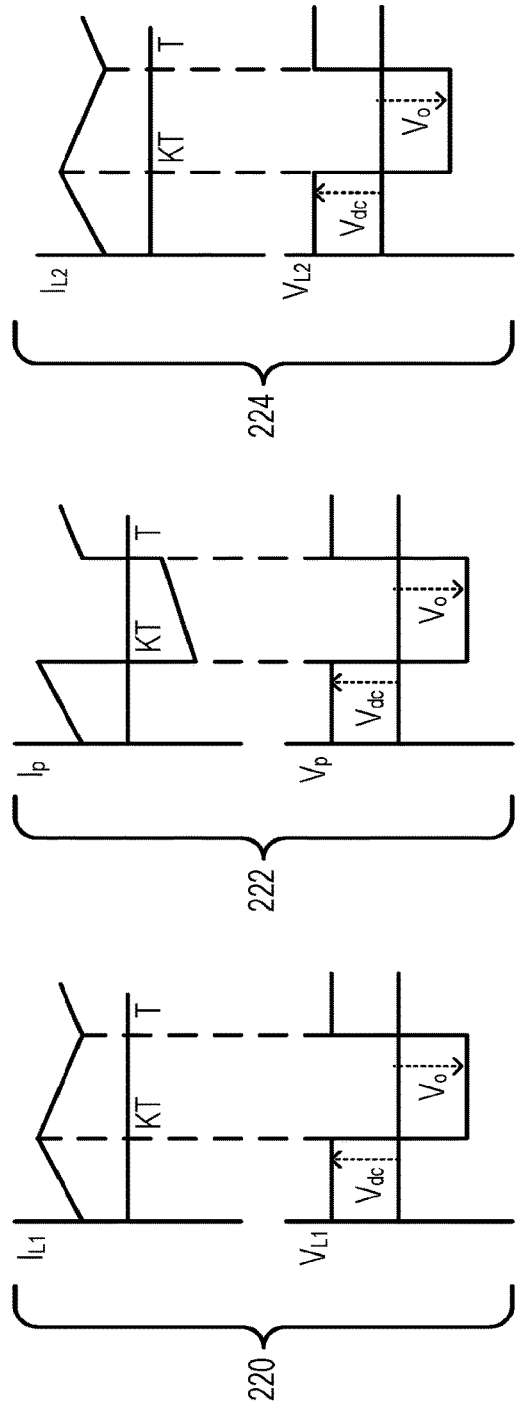
FIG. 2B is an exemplary illustration of voltage and current graphs associated with a Cuk power conversion circuit.

FIG. 2A is an exemplary schematic diagram of a related art isolated Cuk power conversion circuit 200, and FIG. 2B includes exemplary voltage and current graphs that illustrate operations of the Cuk power conversion circuit 200. The primary side of the Cuk power conversion circuit 200 includes an input voltage source $V_i$, a primary inductor $L_1$, a primary capacitor $C_p$, and a switch $Q_1$ with a parallel connected diode $D_1$. The secondary side of the Cuck power conversion circuit 200 includes an output voltage source $V_o$ with an output capacitor $C_o$, a secondary inductor $L_2$, a secondary capacitor $C_s$, and a switch $Q_2$ with a parallel connected diode $D_2$. The primary side and the secondary side of the Cuk power conversion circuit are isolated from one another via a transformer that has a 1:1 turn ratio. Graphs 220 are current $I_{L1}$ and voltage $V_{L1}$ graphs of the primary transformer $L_1$, graphs 222 are current $I_p$ and voltage $V_p$ graphs of a primary side of the transformer and graphs 224 are current $I_{L2}$ and voltage $V_{L2}$ graphs of the secondary transformer $L_2$. In some implementations, the structure of the Cuk power conversion circuit 200 provides increased isolation between the primary side and the secondary side at isolation voltages greater than 1 kV, but the switches Q1 and Q2 operate with hard switching, which reduces circuit efficiency due to switching losses.

Figure 3B:
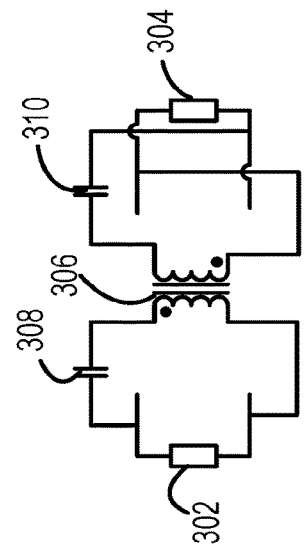
FIG. 3B is an exemplary schematic diagram of a portion of a DC-DC power conversion circuit.
Figure 3D:
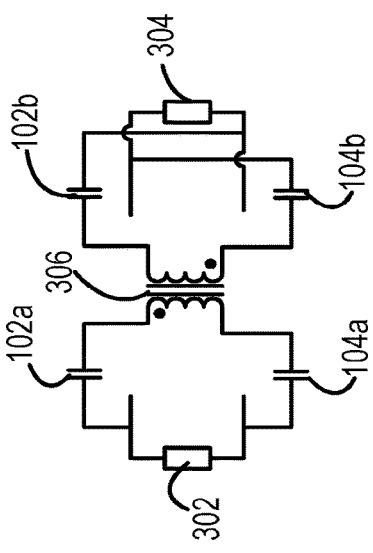
FIG. 3D is an exemplary schematic diagram of a portion of a DC-DC power conversion circuit.
Figure 3A:
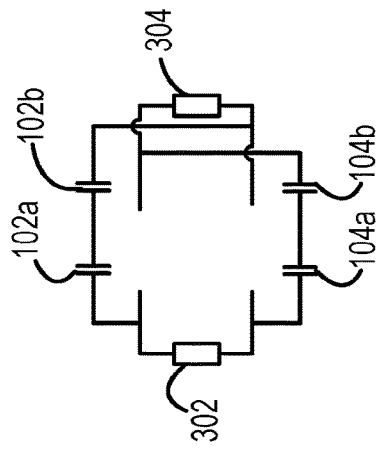
FIG. 3A is an exemplary schematic diagram of a portion of a DC-DC power conversion circuit.
Figure 3C:
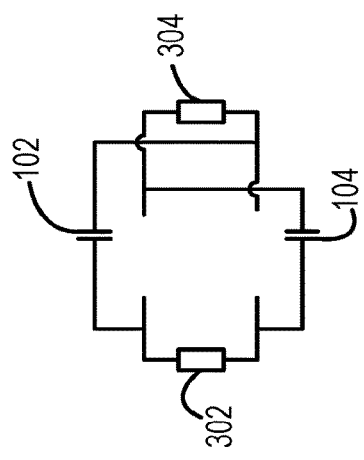
FIG. 3C is an exemplary schematic diagram of a portion of a DC-DC power conversion circuit.

FIGS. 3A-3D are exemplary schematic diagrams of a portion of the isolated DC-DC power conversion circuit 100 that show how the isolation of the DC-DC power conversion circuit 100 can be increased, according to one implementation. For example, FIG. 3A shows primary windings 302 and secondary windings 304 of the magnetic core transformer 114 with the capacitor 102 and the capacitor 104 cross-connected across the primary windings 302 and the secondary windings 304. In FIG. 3B, the capacitor 102 is split into capacitors 102a and 102b, and the capacitor 104 is split into capacitors 104a and 104b. In some implementations, the capacitors 102a, 102b, 104a, and 104b have equal capacitance values. In FIG. 3C, an additional transformer 306 is inserted between the capacitors 102a and 102b and the capacitors 104a and 104b. As will be described further herein, the additional transformer 306 provides increased isolation to the DC-DC power conversion circuit 100. FIG. 3D is another representation of the schematic diagram of FIG. 3C where the capacitors 102a and 104a are combined to form capacitor 308, and the capacitors 102b and 104b are combined to form capacitor 310.

Figure 4:
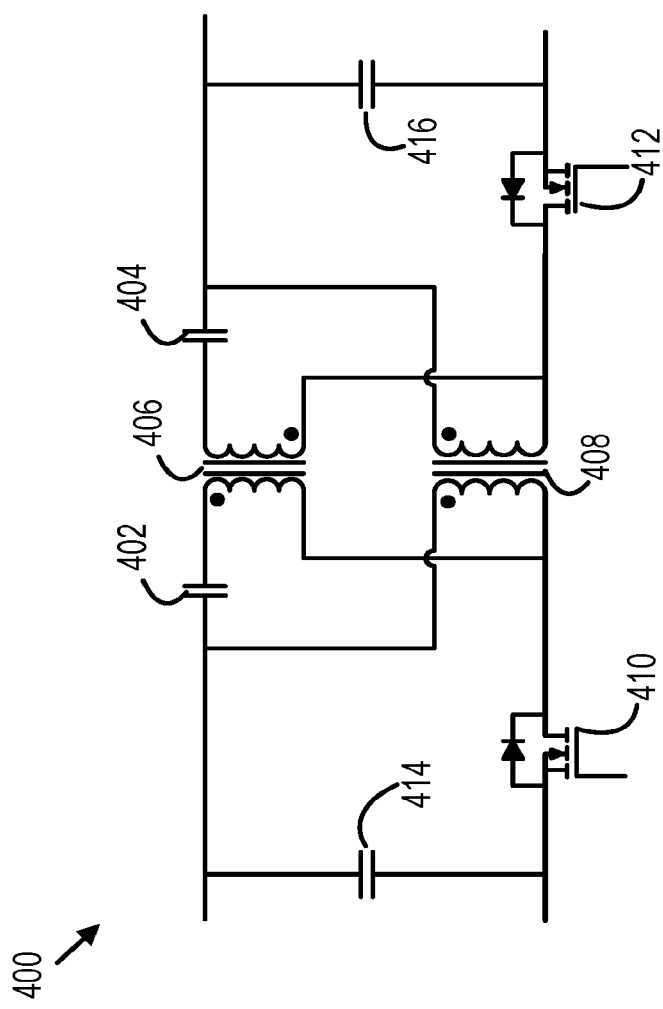
FIG. 4 is an exemplary schematic diagram of an isolated DC-DC power conversion circuit.

FIG. 4 is an exemplary schematic diagram of an isolated DC-DC power conversion circuit 400 which is an implementation of the DC-DC power conversion circuit 100 that incorporates the transformer 306 to increase isolation between the primary side and the secondary side as described with respect to FIGS. 3C and 3D. The DC-DC power conversion circuit 400 can include a primary side and a secondary side that are symmetric across a magnetic core transformer 408 and an additional transformer 406 connected in parallel with the magnetic core transformer 408. For example, the DC-DC power conversion circuit 400 includes a primary switch 410 and a secondary switch 412 on either side of that magnetic core transformer 408 that can be switched on and off to transfer power between a primary DC power source associated with capacitor 414 and a secondary DC power source associated with capacitor 416. Just as with the DC-DC power conversion circuit 100, the primary and secondary DC power sources can function as either power sources or power sinks depending on the direction of power transfer, and DC-DC power conversion circuit 400 can be configured to perform bi-directional power transfer. In addition, the primary DC power source associated with the capacitor 414 and the secondary DC power source associated with the capacitor 416 may have unequal ground potentials.

In some implementations, the DC-DC power conversion circuit 400 also includes the additional transformer 406 and capacitors 402 and 404 that correspond to the transformer 306 and capacitors 308 and 310 from the schematic diagram of FIG. 3D. The capacitor 402 and the capacitor 404 are configured on either side of the additional transformer 406, and the additional transformer 406 is connected in parallel with the magnetic core transformer 408. The additional transformer 406 provides increased isolation between the primary side and the secondary side of the DC-DC power conversion circuit in addition to the isolation provided by the capacitors 402 and 404 and the magnetic core transformer 408. A turn ratio of the additional transformer 406 can be equal to a turn ratio of the magnetic core transformer 408. In addition, the DC-DC power conversion circuit 400 can be configured so that a capacitance the capacitor 402 (or 404) times an excitation inductance of the additional transformer 406 is greater than the capacitance of the capacitor 402 times an excitation inductance of the magnetic core transformer 114 so in order to avoid negative effects of additional resonance such as unwanted voltage and/or current oscillations. A total amount of isolation between the primary side and the secondary side of the DC-DC power conversion circuit 400 is based on a first isolation voltage associated with the capacitors 402 and 404 and a second isolation voltage associated with the additional transformer 406. In one implementation, the total amount of isolation between the primary side and secondary side of the DC-DC power conversion circuit 400 corresponds to an isolation voltage of greater than one kilovolt.

Figure 5:
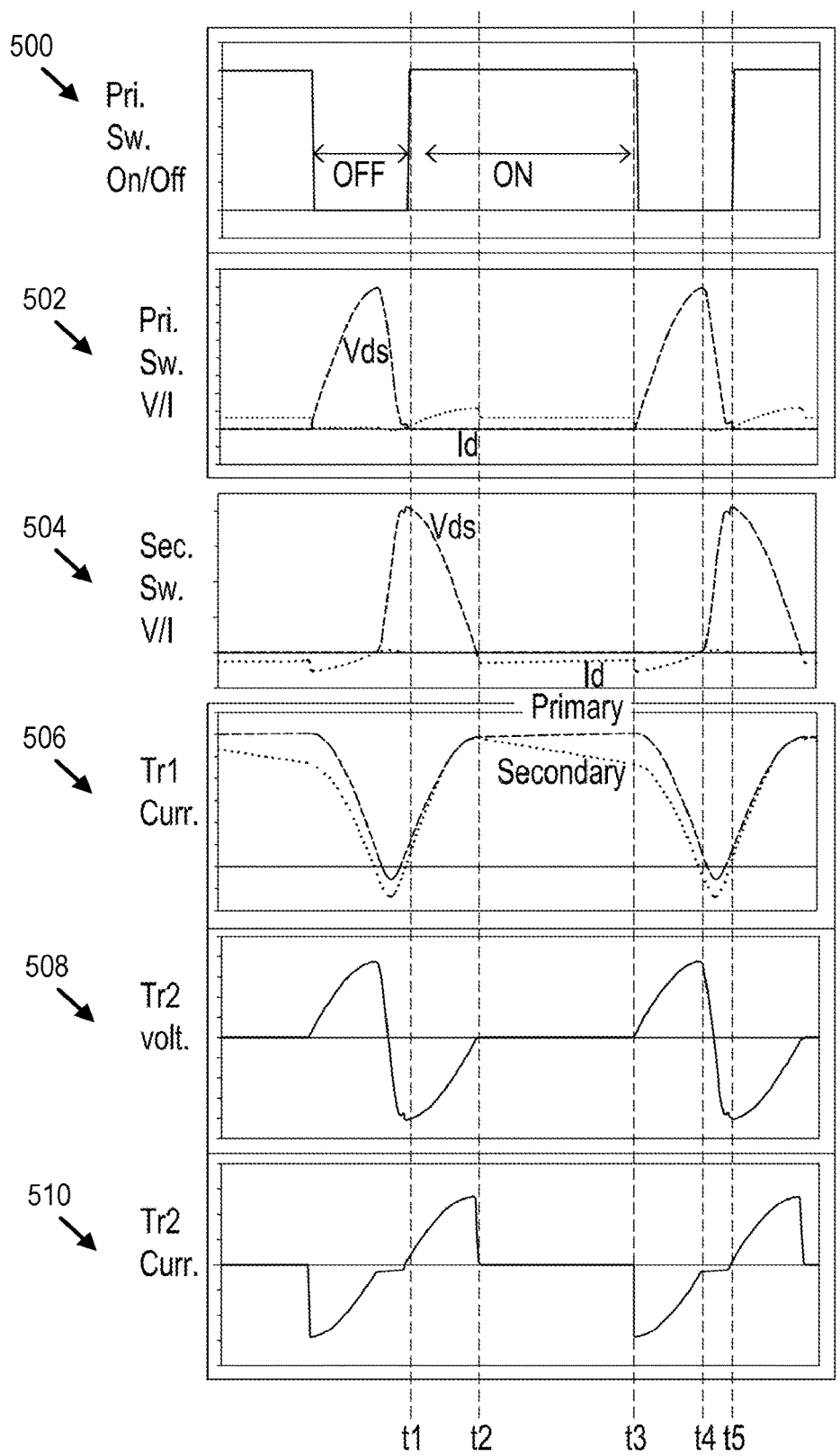
FIG. 5 is an exemplary illustration of voltage and current graphs associated with an isolated DC-DC power conversion circuit.

FIG. 5 is an exemplary illustration of voltage and current graphs associated with the isolated DC-DC power conversion circuit 400. For example, graph 500 illustrates a duty cycle of the primary switch 410 that can be turned on at time $t_1$ and subsequently turned off at time $t_3$. At time $t_5$, another duty cycle can commence. In some implementations, the graph 500 corresponds to gate-source voltage applied by the gate driver to turn the primary switch 410 on and off. An amount of power transferred from the primary side to the secondary side of the isolated DC-DC power conversion circuit 400 can be modified by modifying the duty cycle or the switching frequency of the primary switch 410. The on-time of the primary switch 410 can be increased to increase the amount of power transfer from the primary side to the secondary side of the DC-DC power conversion circuit, and the on-time of the primary switch 410 can be decreased to reduce the amount of power transfer. In addition, as the primary switch 410 is cycled on and off, the secondary switch 412 can be operated as a synchronous rectifier and can be turned on and off at predetermined time intervals to reduce circuit losses.

Graph 502 includes a drain-source voltage ($V_{ds}$) and a drain current ($I_d$) for the primary switch 410 and graph 504 includes a drain-source voltage ($V_{ds}$) and a drain current ($I_d$) for the secondary switch 412 as power is transferred from the primary side to the secondary side of the DC-DC power conversion circuit 400. The graphs 502 and 504 show that primary switch 410 and secondary switch 412 can be operated with soft switching. For example, the primary switch 410 can be turned on when the drain current through the primary switch 410 is zero, which can be referred to as zero current switching (ZCS). In addition, the primary switch 410 can be turned off when the drain-source voltage across the primary switch 410 is zero, which can be referred to as zero voltage switching (ZVS). In some implementations, the secondary switch 412 can also be turned on and off with soft switching when operating as a synchronous rectifier.

In some implementations, bi-directional power transfer can be performed by transferring power from the secondary side to the primary side of the DC-DC power conversion circuit 400 by cycling the secondary switch 412 on and off. The description of the transfer of power from the secondary side to the primary side of the DC-DC power conversion circuit 400 can also be applied to bi-directional power transfer in a straightforward way to one of ordinary skill in the art.

The duty cycle, switching frequency, and direction of power transfer within the DC-DC power conversion circuit 400 can be controlled by one or more electronic control units (ECUs) or similar circuitry. For example, sensors can be installed within battery cells of an electric vehicle (EV) that can sense battery state of charge (SOC), voltage, and the like. In an implementation, the ECUs can process sensor data, display battery SOC information to a user, and send control signals to actuators that align the DC-DC power conversion circuit 400. The ECUs can control the direction of power transfer as well as the quantity of power transferred by the DC-DC power conversion circuit 400 by controlling the duty cycles and switching frequencies of the primary switch 410 and the secondary switch 412. The ECUs can also align the DC-DC power conversion circuit 400 to perform functions determined by input from a user.

Graph 506 includes primary and secondary current curves for the magnetic core transformer 408. When the primary switch 410 is turned on at time $t_1$, the capacitors 402 and 404 discharge energy, and power is transferred from the primary side to the secondary side via the capacitors 402 and 404 and the additional transformer 406, which can be referred to as capacitive power transfer. Primary and secondary currents of the transformer 408 increase in a sinusoidal fashion until approximate maximums are reached at time $t_2$. At time $t_2$, secondary switch diode or the secondary switch 412 turns on, current through the capacitors 402 and 404 goes to zero, and power is transferred from the primary side to the secondary side across the magnetic core transformer 408. The power transfer across the magnetic core transformer 408 can be referred to as inductive power transfer, according to an implementation. The amount of inductive power transfer that occurs can be based on power and voltage characteristics of the power sources and sinks of the DC-DC power conversion circuit 400, magnetic coupling characteristics of the primary and secondary windings of the magnetic core transformer 408, on-time of the primary switch 410, and the like. The current through the primary windings of the magnetic core transformer 114 is constant between times $t_2$ and $t_3$, and the current through the secondary windings may remain constant or slightly decrease between times $t_2$ and $t_3$.

At time $t_3$ when the primary switch 410 is turned off, the current through the primary and secondary windings of the magnetic core transformer 408 decreases in a sinusoidal fashion due to leakage inductance of the magnetic core transformer 408, and capacitive power transfer occurs until the currents reach zero. Therefore, the total amount of power transferred from the primary side to the secondary side of the DC-DC power conversion circuit 400 corresponds to an inductive power transfer period between times $t_2$ and $t_3$ and capacitive power transfer periods between times $t_1$ and $t_2$ and times $t_3$ and $t_4$ during a duty cycle of the primary switch 410.

Graph 508 represents voltage across the additional transformer 406 during a duty cycle of the primary switch 410, and graph 510 represents current across the additional transformer 406 during the duty cycle of the primary switch 410. Between times $t_1$ and $t_2$ and between times $t_3$ and $t_4$ when the capacitive power transfer occurs, the voltage and current across the additional transformer 406 is non-zero. However, from time $t_2$ to time $t_3$ when the inductive power transfer occurs, the voltage and the current of the additional transformer 406 is equal to zero. In some implementations, the inductive power transfer period from time $t_2$ to time $t_3$ is greater than a sum of the capacitive power transfer periods between times $t_1$ and $t_2$ and times $t_3$ and $t_4$. A size of the additional transformer 406 can be based on a time length of the inductive power transfer period. For example, the size of the additional transformer 406 corresponds to a cross-product of the transformer voltage and time over a unit switching period (duty cycle). Because the voltage of the additional transformer 406 is zero from time $t_2$ to time $t_3$, a longer inductive power transfer period can result in the size of the additional transformer 406 being reduced. Therefore, the size of the additional transformer 406 can be inversely proportional to the time length of the inductive power transfer period.

FIG. 6 is an exemplary illustration of voltage and current waveforms for the DC-DC power conversion circuit 100, and FIG. 7 is an exemplary illustration of voltage and current waveforms for the DC-DC power conversion circuit 400 with the additional transformer 406 that increases an amount of isolation between the primary and secondary sides. For the examples shown in FIG. 7, the transformer 114 of the DC-DC power conversion circuit 100 and the transformers 406 and 408 of the DC-DC power conversion circuit 400 have a turn ratio of 5:1. In some implementations, operating characteristics of the DC-DC power conversion circuit 400 correspond to operating characteristics of the DC-DC power conversion 100. For the graphs in FIG. 6 that are associated with the DC-DC power conversion circuit 100, graph 600 represents the gate-source voltage that turns the primary switch 106 on and off, graph 602 includes drain-source voltages for the primary switch 106 and secondary switch 108, and graph 604 includes drain currents for the primary switch 106 and secondary switch 108. For the graphs in FIG. 7 that are associated with the DC-DC power conversion circuit 400, graph 700 represents the gate-source voltage that turns the primary switch 410 on and off, graph 702 includes drain-source voltages for the primary switch 410 and secondary switch 412, and graph 704 includes drain currents for the primary switch 410 and secondary switch 412.

Figures 8A, 8B:
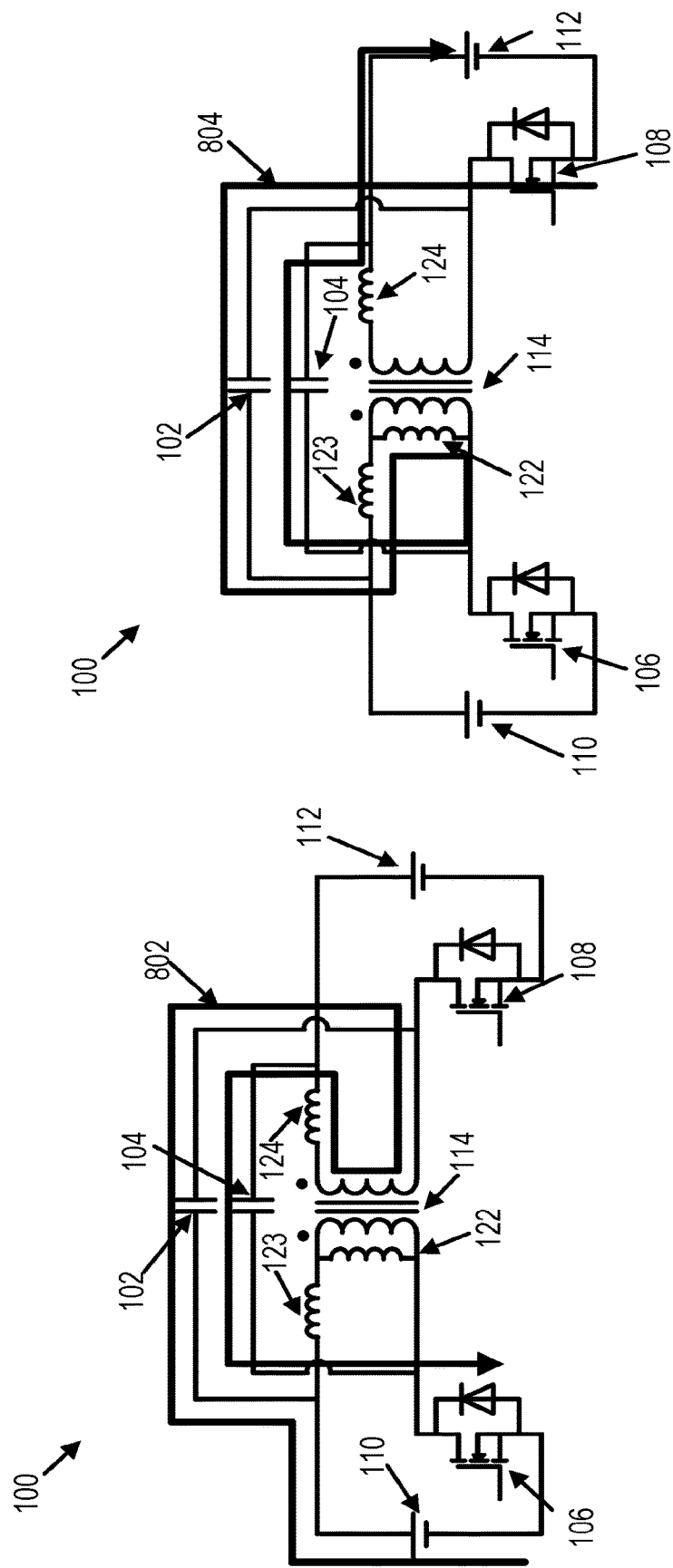
FIG. 8A is an exemplary schematic diagram of an isolated DC-DC power conversion circuit.
FIG. 8B is an exemplary schematic diagram of an isolated DC-DC power conversion circuit.

In FIG. 6, the capacitive power transfer periods are represented by time periods T610 and T614, and the inductive power transfer period is represented by time period T612. For the DC-DC power conversion circuit 100, the capacitive power transfer period T610 that occurs before the inductive power transfer period T612 is shorter than the capacitive power transfer period T614 that occurs after the inductive power transfer period T612. For example, FIG. 8A is an exemplary schematic diagram that shows current path 802 through the DC-DC power conversion circuit 100 during the capacitive power transfer period 610, and FIG. 8B is an exemplary schematic diagram that shows current path 804 through the DC-DC power conversion circuit 100 during the capacitive power transfer period 614. Series resonance occurs during both capacitive power transfer periods 610 and 614, but a resonant frequency during the capacitive power transfer period 610 is greater than a resonant frequency during the capacitive power transfer period 614, which means that the capacitive power transfer period 610 is shorter than the capacitive power transfer period 614. For example, the resonance frequency for the capacitive power transfer period 610 is equal to $$f_{610} = \frac{1}{2\pi\sqrt{L_l \frac{C}{2}}},$$

where $L_l$ corresponds to leakage inductance $L_{124}$. The resonance period for the capacitive power transfer period 614 is equal to $$f_{614} = \frac{1}{2\pi\sqrt{N^2 L_l \frac{C}{2}}},$$

and $L_l$ corresponds to leakage inductance $L_{123}$.

Referring back to FIG. 7, the capacitive power transfer periods are represented by time periods T710 and T714, and the inductive power transfer period is represented by time period T712. For the DC-DC power conversion circuit 400, the inductive power transfer period T712 is longer than the inductive power transfer period T612 for the DC-DC power conversion circuit 100, and a time length of the capacitive power transfer period T710 that occurs before the inductive power transfer period T712 is equal to a time length of the capacitive power transfer period T714 that occurs after the inductive power transfer period T712.

Figure 9B:
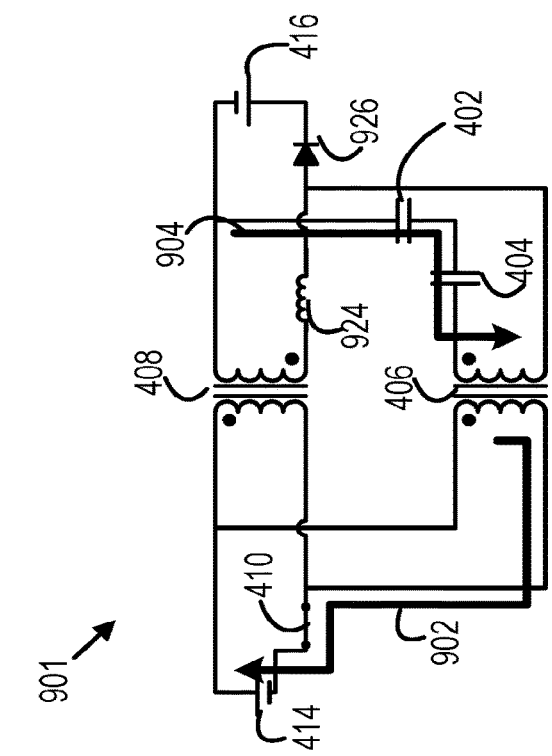
FIG. 9B is an exemplary schematic diagram of an isolated DC-DC power conversion circuit.
Figure 9A:
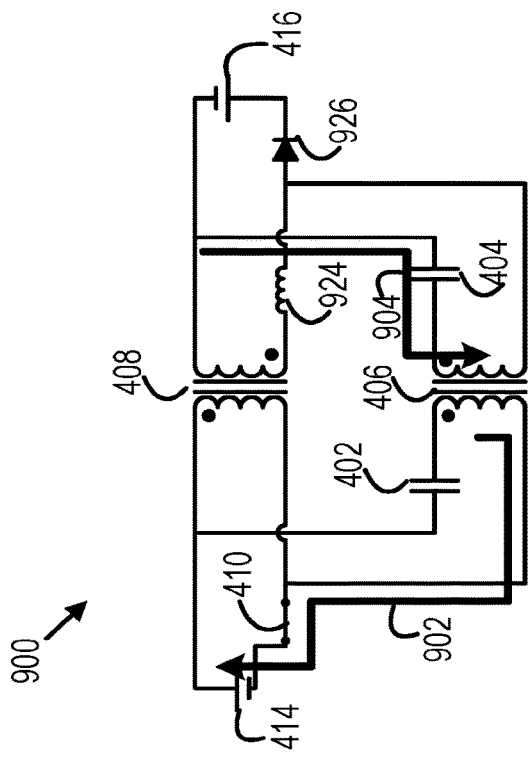
FIG. 9A is an exemplary schematic diagram of an isolated DC-DC power conversion circuit.

FIGS. 9A and 9B are exemplary schematic diagrams that show current paths 902 and 904 through the DC-DC power conversion circuit 400 during the capacitive power transfer period 710 before the inductive power transfer period 712. For example, schematic diagram 900 in FIG. 9A is a representation of the DC-DC power conversion circuit 400 that includes secondary leakage inductor 924 and diode 926 in place of the secondary switch 412, and schematic diagram 901 in FIG. 9B is an equivalent circuit of the DC-DC power conversion circuit 901 that includes the capacitors 402 and 404 on the secondary side of the DC-DC power conversion circuit 901 where voltage stress associated with the series resonance occurs. The primary switch 410 is shut during the capacitive power transfer period 710, and power is transferred between the primary and secondary sides via the capacitors 402 and 404 and the additional transformer 406 according to the current paths 902 and 904.

Figure 10B:
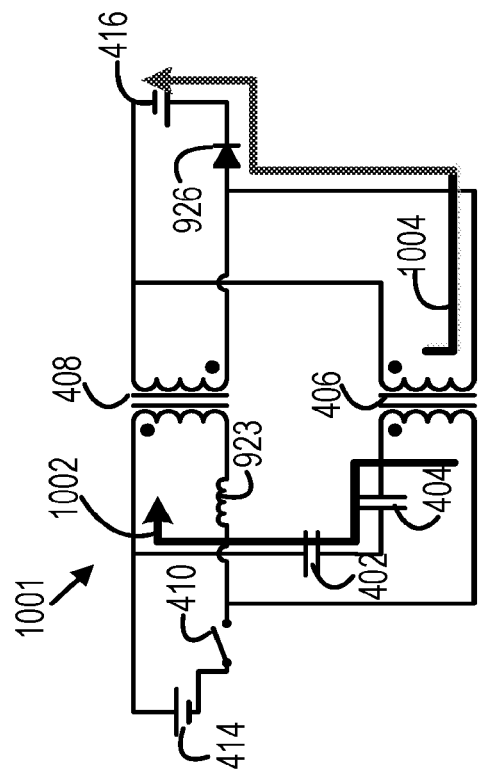
FIG. 10B is an exemplary schematic diagram of an isolated DC-DC power conversion circuit.
Figure 10A:
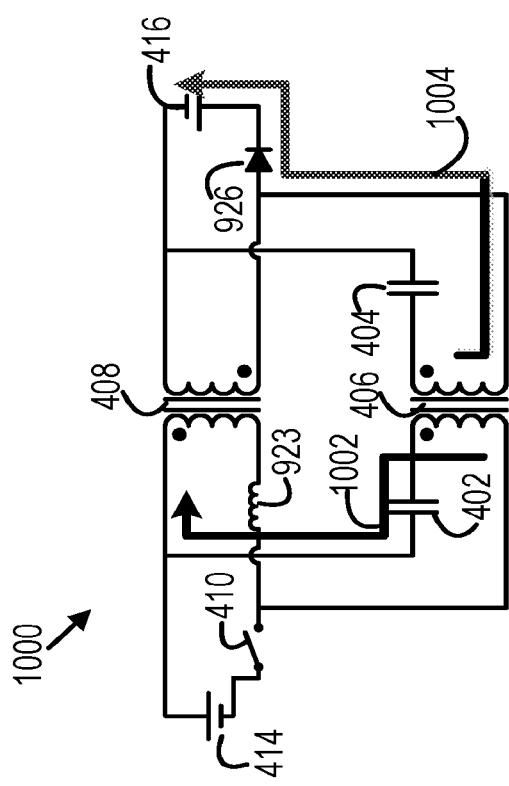
FIG. 10A is an exemplary schematic diagram of an isolated DC-DC power conversion circuit.

FIGS. 10A and 10B are exemplary schematic diagrams that show current paths 1002 and 1004 through the DC-DC power conversion circuit 400 during the capacitive power transfer period 714 after the inductive power transfer period 712. For example, schematic diagram 1000 in FIG. 10A is a representation of the DC-DC power conversion circuit 400 that includes primary leakage inductor 923 and diode 926 in place of the secondary switch 412, and schematic diagram 1001 in FIG. 10B is an equivalent circuit of the DC-DC power conversion circuit 1001 that includes the capacitors 402 and 404 on the primary side of the DC-DC power conversion circuit 1001 where voltage stress associated with the series resonance occurs. The primary switch 410 is open during the capacitive power transfer period 714, and power is transferred between the primary and secondary sides via the capacitors 402 and 404 and the additional transformer 406 according to the current paths 1002 and 1004.

The resonant frequency for the capacitive power transfer periods 710 and 714 are equal and can be described by the equation, $$\omega = \frac{1}{\sqrt{L_l C_{1+N^2}^{N^2}}},$$

where and $L_l$ corresponds to leakage inductance $L_{923}$ or leakage inductance $L_{924}$, which may be equal according to one example. In some implementations, the inductive power transfer is more efficient than the capacitive power transfer and results in fewer circuit losses. The longer inductive power transfer period T712 for the DC-DC power conversion circuit 400 results in a greater efficiency of power transfer than the power transfer efficiency of the DC-DC power conversion circuit 100 with the shorter inductive power transfer period T612.

In addition, the graph 602 in FIG. 6 shows that for the DC-DC power conversion circuit 100, a peak voltage 606 for the primary switch 106 during the capacitive power transfer period 614 is approximately equal to a peak voltage 608 for the secondary switch 108 during the capacitive power transfer period 610. For example, the peak voltages 606 and 608 associated with LC resonance can be described by equation, $$V_p = \frac{I_x}{\omega C}, I_x$$

corresponds to an initial current through leakage inductors 123 or 124. During the capacitive power transfer period 610 when the primary switch 106 is closed, the voltage stress is associated with the peak voltage 608 of the secondary switch 108 and can be described by the equation, $$V_{peak(108)} \propto \sqrt{\frac{2L_l}{C}} I_x.$$

During the capacitive power transfer period when the primary switch 106 is open, the voltage stress associated with the peak voltage of the primary switch 106 can also be described by the equation, $$V_{peak(S106)} \propto \sqrt{\frac{2L_l}{C}} I_x.$$

The graph 702 in FIG. 7 shows that for the DC-DC power conversion circuit 400, a peak voltage 706 for the primary switch 410 is greater than a peak voltage 708 for the secondary switch 412 during a duty cycle of the primary switch 410 or the secondary switch 412. For example, the peak voltages 706 and 708 associated with LC resonance can be described by equation, $$V_p = \frac{I_x}{\omega C}, I_x$$

corresponds to an initial current through leakage inductors 923 or 924. During the capacitive power transfer period 710 when the primary switch 410 is closed, the voltage stress is associated with the peak voltage 708 of the secondary switch 412 and can be described by the equation, $$V_{peak(412)} \propto \frac{1}{\omega C_r} I_x,$$

where $C_r = C$. During the capacitive power transfer period when the primary switch 410 is open, the voltage stress associated with the peak voltage of the primary switch 410 can also be described by the equation, $$V_{peak(410)} \propto \frac{1}{\omega C_r} NI_x,$$

where $C_r = C/N^2$.

In addition, the peak voltage 706 for the primary switch 410 is greater than the peak voltages 606 and 608 for the DC-DC power conversion circuit 100, and the peak voltage 708 for the secondary switch 712 is less than the peak voltages 606 and 608. In one implementation, the peak voltage 706 for the primary switch 410 can be approximately equal to 70V, and the peak voltage 708 for the secondary switch 412 can be approximately equal to 14V. Therefore, the primary switch 410 can have a greater voltage rating than a voltage rating of the secondary switch 412.

Figure 11:
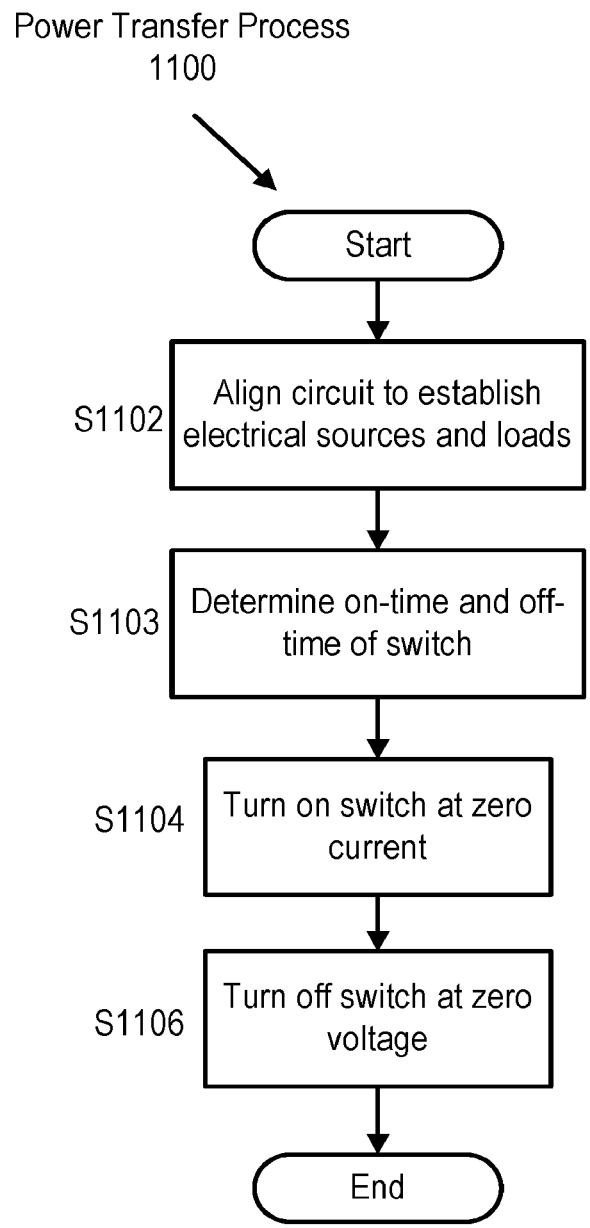
FIG. 11 is an exemplary flowchart of a power transfer process.

FIG. 11 is an exemplary flowchart of a power transfer process 1100. Steps of the power transfer process 1100 can be performed by control circuitry of the ECU or other controller that includes a processor and can issue control signals to the gate driver circuits for the primary switch 410 and/or secondary switch 412. The power transfer process 1100 is described with respect to the DC-DC power conversion circuit 400 but could also be implemented on other types and configurations of power conversion circuits.

At step S1102, control signals are sent to align at least one DC-DC power conversion circuit 400 based on a desired direction of power transfer. In some implementations, the electrical components of a vehicle can be connected to the capacitor 414 and/or capacitor 416 and can function as either power sources or electrical loads. For example, a battery cell in an electrical system of an electric vehicle (EV) can function as a power source to power electrical components of a vehicle, such as brakes, audio systems, and the like. The battery cell can also function as an electrical load during battery cell balancing among a plurality of battery cells. The control circuitry can send control signals to voltage sensors, current sensors, and timers as well as to the primary switch 410 and the secondary switch 412 to align the DC-DC power conversion circuit 400 for the desired direction of power transfer.

At step S1103, the control circuitry determines the on-time and off-time for the primary switch 410 and the secondary switch 412 of the DC-DC power conversion circuit 400. In some implementations, the control circuitry can determine the amount on-time per duty cycle of the primary switch 410 based on power and voltage characteristics of the power sources and electrical loads. For example, the amount of on-time of the primary switch 410 can correspond to the load size, type, and configuration as well as a state of charge (SOC) or time of life of the power cell, such as one or more battery cells of an energy module. In addition, the control circuitry can determine the on-time and off-time of the secondary switch 412 that functions as the synchronous rectifier while still maintaining the soft-switching.

At step S1104, if power is being transferred from the primary side to the secondary side of the DC-DC power conversion circuit 400, a control signal is sent to turn on the primary switch 410 when the current through the primary switch 410 is zero to implement ZCS. The control circuitry can receive sensor data relating to current at the primary switch 410 to determine when to send the control signal to turn on the primary switch 410. In an implementation, the control signal is sent to a gate driver circuit that turns on the primary switch 410. In some aspects, the gate driver circuits can be integrated into the primary switch 410 and the secondary switch 412. The time at which the primary switch 410 is turned on can correspond to the beginning of the active signal time for the duty cycle of the primary switch 410. In addition, the secondary switch 412 can be turned on when the drain-source voltage of the secondary switch 412 decreases to approximately zero to operate as the synchronous rectifier when power is transferred from the primary side to the secondary side of the DC-DC power conversion circuit 400.

The amount of power transferred from the primary side to the secondary side of the DC-DC power conversion circuit 100 can be modified by changing an amount of on-time of the primary switch 410. To increase the amount of power transferred from the primary side to the secondary side of the DC-DC power conversion circuit 400, the on-time of the primary switch 410 can be increased. To decrease the amount of power transferred from the primary side to the secondary side of the DC-DC power conversion circuit 400, the on-time of the primary switch 410 can be decreased. In some implementations, when the amount of power transfer is increased or decreased by modifying the amount of on-time in the normal operation mode, the amount of off-time for the primary switch 410 can remain constant. The quantity of power that is transferred from the primary side to the secondary side of the isolated DC-DC power conversion circuit 400 can also be determined based on the power and voltage characteristics of the electrical components in the electrical system, such as the voltage and current of battery cells, loads, and the like.

At step S1106, a control signal is sent to turn off the primary switch 410 to implement ZVS when the voltage at the primary switch 410 is zero, which can end the active signal time for the duty cycle of the primary switch 410. The control circuitry can receive sensor data relating to voltage at the primary switch 410 to determine when to send the control signal to turn off the primary switch 410. In some implementations, the control circuitry can determine when to turn on and off the primary switch 410 based on the capacitance of capacitors 402 and 404, leakage inductance of the transformers 406 and 408, turn ratio of the transformers 406 and 408, and values of other circuit components. The primary switch 410 can be turned on again to commence another duty cycle when the amount of constant off-time has passed. In addition, the secondary switch 412 can be turned off when the voltage across the secondary switch 412 is approximately zero in order to maintain the ZVS for the secondary switch 412.

Aspects of the present disclosure are directed to increasing isolation between a primary side and a secondary side of the DC-DC power conversion circuit by including the additional magnetic core transformer 406 in parallel with the magnetic core transformer 408 while still preserving the soft switching operating characteristics of the primary switch 410 and/or secondary switch 412. The structure of the DC-DC power conversion circuit 400 also results in a reduced voltage peak for the primary switch 410, which reduces cost of the circuit when compared with the DC-DC power conversion circuit 100 because a less expensive switch with a lower voltage rating can be used for the primary switch 410. Also, the DC-DC power conversion circuit 400 has a longer inductive power transfer period than the DC-DC power conversion circuit 100, which improves an efficiency of power transfer.

Blocks or circuits of computer architecture (i.e., circuitry) shown or described herein can be implemented in a single processing system, or distributed across a plurality of processing systems, which may be referred to as separate processors or circuits. For instance, each of the blocks of architecture can be a discrete processor, system, or logic component. Further, exemplary functions or features can be performed by common circuitry or by a general purpose processor executing specific instructions.

Figure 12:
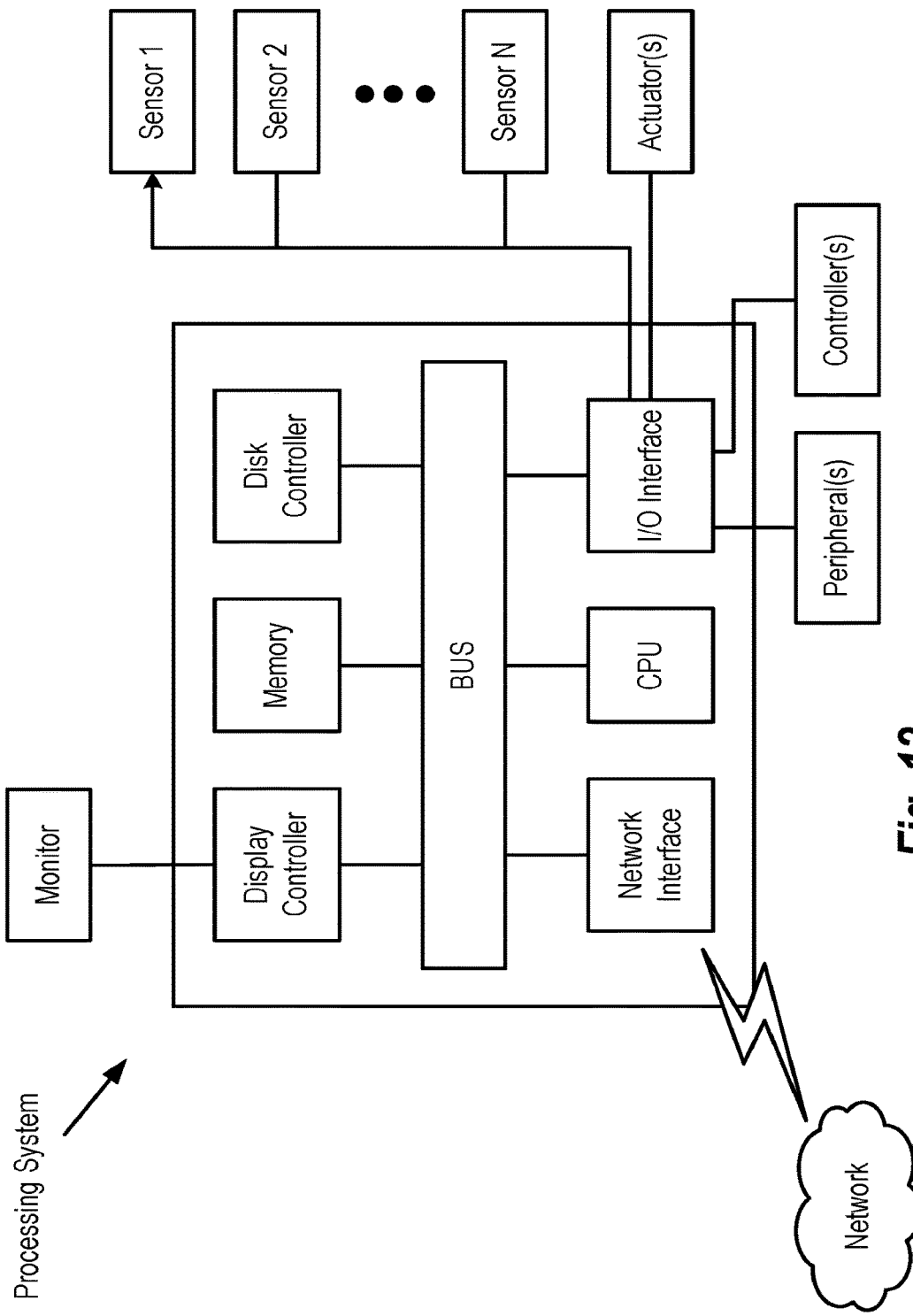
FIG. 12 schematically illustrates a processing system, such as a controller and/or a computer system.

FIG. 12 illustrates an exemplary processing system (i.e., an exemplary processor or circuitry). One or more of such processing systems can be utilized in or to execute one or more algorithms, or portions thereof, or one or more architecture blocks, or portions thereof, in accordance with the descriptions provided herein. The system can be embodied and/or implemented as an electronic control unit (ECU) or a discrete computer installed in a vehicle.

The exemplary processing system can be implemented using one or more microprocessors or the equivalent, such as a central processing unit (CPU) and/or at least one application specific processor ASP (not shown). The microprocessor is circuitry that utilizes a computer readable storage medium, such as a memory circuit (e.g., ROM, EPROM, EEPROM, flash memory, static memory, DRAM, SDRAM, and their equivalents), configured to control the microprocessor to perform and/or control the processes and systems of this disclosure. Other storage mediums can be controlled via a controller, such as a disk controller, which can controls a hard disk drive or optical disk drive.

The microprocessor or aspects thereof, in alternate implementations, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The microprocessor can be a separate device or a single processing mechanism. Further, this disclosure can benefit from parallel processing capabilities of a multi-cored CPU. Control circuitry provided by one or more processors in a multi-processing arrangement may also be employed to execute sequences of instructions contained in memory. Alternatively, hard-wired circuitry may be used in place of or in combination with software instructions. Thus, the exemplary implementations discussed herein are not limited to any specific combination of hardware circuitry and software.

In another aspect, results of processing in accordance with this disclosure can be displayed via a display controller to a monitor. The display controller preferably includes at least one graphic processing unit, which can be provided by a plurality of graphics processing cores, for improved computational efficiency. The display controller or portions thereof can also be incorporated into the CPU. Additionally, an I/O (input/output) interface is provided for inputting signals and/or data from a microphone, speakers, cameras, a mouse, a keyboard, a touch-based display or pad interface, etc., which can be connected to the I/O interface as a peripheral. For example, a keyboard or a pointing device for controlling parameters of the various processes or algorithms of this disclosure can be connected to the I/O interface to provide additional functionality and configuration options, or control display characteristics. Moreover, the monitor can be provided with a touch-sensitive or gesture-detecting interface for providing a command/instruction interface.

In an exemplary implementation, the I/O interface is provided for inputting sensor data from Sensors 1, 2 . . . N. The sensors can include battery voltage sensors, temperature sensors, current sensors, or sensors that can detect opening or closing of a switch. Other sensors that input data to the I/O interface may include velocity sensors, acceleration sensors, steering sensors, gyroscope sensors, and the like. In addition, the I/O interface is provided for inputting data from one or more controllers that enable a user to control the configuration of the DC-DC power conversion circuit 400 or distributed power system. For example, the user can use the controller to set up default periods and duty cycles for the primary switch 410 and the secondary switch 412 of the DC-DC power conversion circuit 400. The I/O interface can also provide an interface for outputting control signals to one or more actuators to control various actuated components, including gate driver circuits and other circuitry in the DC-DC power conversion circuit 400. In some implementations, the actuators send control signals to control the duty cycle or switching frequency of the primary switch 410 and secondary switch 412, operating frequency, and direction of power transfer of the DC-DC power conversion circuit 400.

The I/O interface can also be connected to a mobile device, such as a smartphone and/or a portable storage device. The I/O interface can include a Universal Serial Bus (USB) hub, Bluetooth circuitry, Near Field Communication (NFC) circuitry, or other wired or wireless communication circuits. In some aspects, the mobile device can provide sensor input, navigation input, and/or network access.

The above-noted components can be coupled to a network, such as the Internet or a local intranet, via a network interface for the transmission or reception of data, including controllable parameters. The network interface can include one or more IEEE 802 compliant circuits. A central BUS is provided to connect the above hardware components/circuits together and provides at least one path for digital communication there between.

The processing system may be a networked desktop computer, terminal, or personal device, such as a tablet computer or a mobile phone. The database discussed above may be stored remotely on a server, and the server may include components similar to or the same as the processing system. These devices may communicate via the network.

Suitable software, such as an operating system or an application, can be tangibly stored on a computer readable medium of a processing system, including the memory and storage devices. Other examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read. The software may include, but is not limited to, device drivers, operating systems, development tools, applications software, and/or a graphical user interface.

Computer code elements on the above-noted medium may be any interpretable or executable code mechanism, including but not limited to scripts, interpretable programs, dynamic link libraries (DLLs), Java classes, and complete executable programs. Moreover, parts of the processing of aspects of this disclosure may be distributed for better performance, reliability and/or cost.

The procedures and routines described herein can be embodied as a device, system, method, or computer program product, and can be executed via one or more dedicated circuits or programmed processors. Accordingly, the descriptions provided herein may take the form of exclusively hardware, exclusively software executed on hardware (including firmware, resident software, micro-code, etc.), or through a combination of dedicated hardware components and general processors that are configured by specific algorithms and process codes. Hardware components are referred to as a "circuit," "module," "unit," "device," or "system." Executable code that is executed by hardware is embodied on a tangible memory device, such as a computer program product. Examples include CDs, DVDs, flash drives, hard disk units, ROMs, RAMS, and other memory devices.

Reference has been made to flowchart illustrations and block diagrams of methods, systems and computer program products according to implementations of this disclosure. Aspects thereof are implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, an implementation may be performed on modules or hardware not identical to those described. Accordingly, other implementations are within the scope that may be claimed.

The invention claimed is:

1. A system comprising:
    DC-DC power conversion circuitry including
        a first switch and a second switch on either side of a first transformer, and
        a first capacitor connected in series with a first side of a second transformer and a second capacitor connected in series with a second side of the second transformer, the second transformer being that is connected in parallel with the first transformer with the first and second capacitors therebetween; and
    control circuitry configured to
        align a primary side and a secondary side of the DC-DC power conversion circuitry based a direction of power transfer,
        determine a quantity of power transfer through the DC-DC power conversion circuitry based on power and voltage characteristics of electrical components,
        determine a duty cycle and a switching frequency for the first switch or the second switch based on the quantity of power transfer through the DC-DC power conversion circuitry, and
        control switching of the first switch and the second switch.

2. The system of claim 1, wherein the DC-DC power conversion circuitry is configured to perform bi-directional power transfer.

3. The system of claim 1, wherein an amount of isolation between the primary side and the secondary side of the DC-DC power conversion circuitry is based on a first isolation voltage associated with the first capacitor and the second capacitor and a second isolation voltage associated with the second transformer.

4. The system of claim 3, wherein the amount of isolation between the primary side and the secondary side of the DC-DC power conversion circuitry corresponds to a total isolation voltage of greater than one kilovolt.

5. The system of claim 1, wherein the control circuitry is further configured to control the switching of the first switch and the second switch with soft switching.

6. The system of claim 1, wherein the quantity of power transfer through the DC-DC power conversion circuitry includes an amount of capacitive power transfer across the first capacitor, the second capacitor, and the second transformer and an amount of inductive power transfer across the first transformer.

7. The system of claim 6, wherein the amount of inductive power transfer corresponds to an inductive power transfer period during the duty cycle of the first switch and the amount of capacitive power transfer corresponds to a first capacitive power transfer period before the inductive power transfer period and a second capacitive power transfer period after the inductive power transfer period.

8. The system of claim 7, wherein a first time length of the first capacitive power transfer period is equal to a second time length of the second capacitive power transfer period.

9. The system of claim 1, wherein a first peak voltage of the first switch is greater than a second peak voltage across the second switch during the duty cycle of the first switch or the second switch.

10. The system of claim 9, wherein a first voltage rating of the first switch is greater than a second voltage rating of the second switch.

11. The system of claim 1, wherein a voltage and current of the second transformer are zero during an inductive power transfer period during the duty cycle of the first switch or the second switch.

12. The system of claim 11, wherein a size of the second transformer is based on a time length of the inductive power transfer period.

13. The system of claim 12, wherein the size of the second transformer is inversely proportional to the time length of the inductive power transfer period.

14. The system of claim 1, wherein the primary side and the secondary side of the DC-DC power conversion circuitry are symmetric across the first transformer and the second transformer.

15. The system of claim 1, wherein the primary side and secondary side of the DC-DC power conversion circuitry are connected to one or more power sources or electrical loads.

16. The system of claim 15, wherein the one or more power sources or electrical loads on the primary side and the secondary side of the DC-DC power conversion circuitry have unequal ground potentials.

17. A method comprising:
aligning, based on a direction of power transfer, a primary side and a secondary side of DC-DC power conversion circuitry including a first switch and a second switch on either side of a first transformer, a first capacitor connected on a first side of a second transformer, and a second capacitor connected on a second side of the second transformer, the second transformer being connected in parallel with the first transformer with the first and second capacitors therebetween;
determining a quantity of power transfer through the DC-DC power conversion circuitry based on power and voltage characteristics of electrical components;
determining a duty cycle and a switching frequency for the first switch or the second switch based on the quantity of power transferred through the DC-DC power conversion circuitry; and
controlling switching of the first switch and the second switch.

18. A non-transitory computer-readable storage medium including executable instructions, which when executed by circuitry, causes the circuitry to perform the method according to claim 17.

19. A system controller comprising control circuitry configured to:
align, based on a direction of power transfer, a primary side and a secondary side of DC-DC power conversion circuitry including a first switch and a second switch on either side of a first transformer, a first capacitor connected on a first side of a second transformer, and a second capacitor connected on a second side of the second transformer, the second transformer being connected in parallel with the first transformer with the first and second capacitors therebetween;
determine a quantity of power transfer through the DC-DC power conversion circuitry based on power and voltage characteristics of electrical components;
determine a duty cycle and a switching frequency for the first switch or the second switch based on the quantity of power transferred through the DC-DC power conversion circuitry; and
control switching of the first switch and the second switch.

* * * * *

UNITED STATES PATENT AND TRADEMARK OFFICE
CERTIFICATE OF CORRECTION

Page 1 of 1

PATENT NO. : 9,853,551 B2
APPLICATION NO. : 15/143917
DATED : December 26, 2017
INVENTOR(S) : Masanori Ishigaki et al.

It is certified that error appears in the above-identified patent and that said Letters Patent is hereby corrected as shown below:

On the Title Page

The Terminal Disclaimer information has been omitted. The Notice Information and Item (45) should read:
-- (*) Notice: Subject to any disclaimer, the term of this
patent is extended or adjusted under 35
U.S.C. 154(b) by 0 days.

This patent is subject to a terminal disclaimer.

(45) Date of Patent: * Dec. 26, 2017 --

Signed and Sealed this
Second Day of July, 2019

Andrei Iancu
*Director of the United States Patent and Trademark Office*